United States Patent [19]

Castellani et al.

[11] Patent Number: 4,827,080
[45] Date of Patent: May 2, 1989

[54] MULTIPLE SERVICE FITTING

[75] Inventors: Norman Castellani, 5 Vermont Dr., Paramus, N.J. 07652; Robert C. Holland, 271 Palisade Ave., Emerson, N.J. 07630; Gerard Holland, 39 Donna Ct., Nutley, N.J. 07110

[73] Assignees: Norman Castellani; Robert C. Holland; Gerard Holland; Raceway Components, Inc., all of Nutley, N.J.

[21] Appl. No.: 62,234

[22] Filed: Jun. 15, 1987

[51] Int. Cl.$^4$ ............................................. H02G 3/22
[52] U.S. Cl. .................................................... 174/48
[58] Field of Search ..................... 174/48, 49; 52/221; 248/27.1

[56] References Cited

U.S. PATENT DOCUMENTS 4,336,416  6/1982  Goodsell ................................ 174/48
4,572,923  2/1986  Castellani et al. ..................... 174/48

Primary Examiner—Arthur T. Grimley
Assistant Examiner—David A. Tone
Attorney, Agent, or Firm—Drucker & Sommers

[57] ABSTRACT

A multiple service fitting for enabling through-floor passage of a plurality of different types of conductors, from a multi-cell underfloor raceway source thereof to an in-floor or above-floor outlet therefor.

A mechanism operable from the accessible end of such fitting enables secure engagement thereof with the top walls of the multi-cell underfloor raceway without moving the fitting body portion, to compensate for floor slab deflection.

A grommet and conduit extending tube, seated in and projecting from the opening in the top wall of the underfloor raceway cell, isolate and protect conductors passing therethrough.

9 Claims, 2 Drawing Sheets

MULTIPLE SERVICE FITTING

BACKGROUND OF THE INVENTION

The invention relates generally to insert devices for passing conductors therethrough. It relates specifically to a multiple service fitting for enabling through-floor passage of a plurality of different types of conductors, as data, power, and telephone, from a multi-cell underfloor raceway source thereof to an in-floor or above-floor outlet therefor.

It has been known in the art to provide a fitting connectable to a single-cell underfloor raceway, as in U.S. Pat. No. 4,572,923. Such fitting includes a mechanism for press-fitting the main body portion thereof into a floor opening, so that such body portion engages the underfloor raceway cell top wall, to retain the fitting in the floor opening.

Such fitting is not specifically adapted to connect with a multi-cell underfloor raceway conductor source, to enable a plurality of different types of conductors to pass therethrough. It is further not specifically adapted to connect with either a flush outlet or outlet box, to enable such different types of services to be provided at the outlet thereof.

Further, such fitting does not include an accessible mechanism for enabling enagagement thereof with the top wall of the underfloor raceway cell, after insertion of the fitting into the floor opening therefor, without moving the fitting body portion from such inserted position, compensating for floor slab deflection and securely retaining the fitting in the floor opening in an efficient and effective manner.

Such fitting further does not include a grommet for protecting the conductors pulled through the opening in the underfloor raceway cells, and does not include a conduit extender seated in such grommet for extending the length of the channel through which the conductors pass to isolate and protect such conductors.

SUMMARY OF THE INVENTION

The multiple service fitting of the invention is adapted to overcome the above problems, as well as others, associated with the prior art.

Such fitting is adapted to be inserted in an opening formed in a floor at a selected location therein after setting of the concrete slab portion of the floor. It is further adapted to be connected to a multi-cell underfloor raceway, constituting a source of a plurality of different types of conductors, to enable passage of such multi-conductors therethrough.

It further includes a mechanism, operable from the accessible end of the fitting, adapted to enable secure engagement thereof with the top wall of the underfloor raceway cells upon insertion of the fitting body portion into the floor opening. It is further adapted to so engage the raceway cell without moving the fitting body portion, and to compensate for floor slab portion deflection. It further includes a grommet, and conduit extending tube seated therein, for protecting and isolating conductors pulled through the raceway cell opening.

DESCRIPTION OF THE PREFERRED EMBODIMENTS

Figure 1:
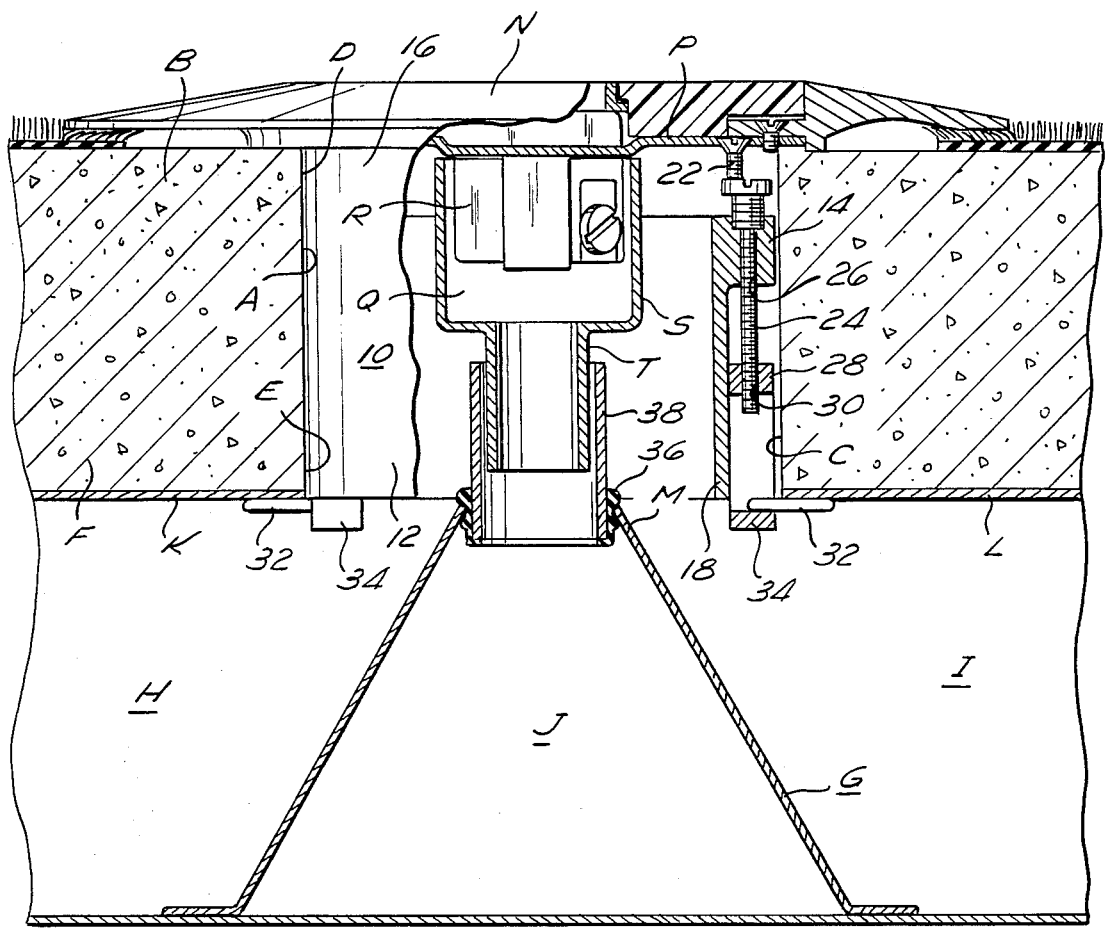
FIG. 1 is an elevational partly sectional view of a first embodiment of a multiple service fitting installed in a through-floor opening, secured to a multi-cell underfloor raceway and a flush outlet.
Figure 2:
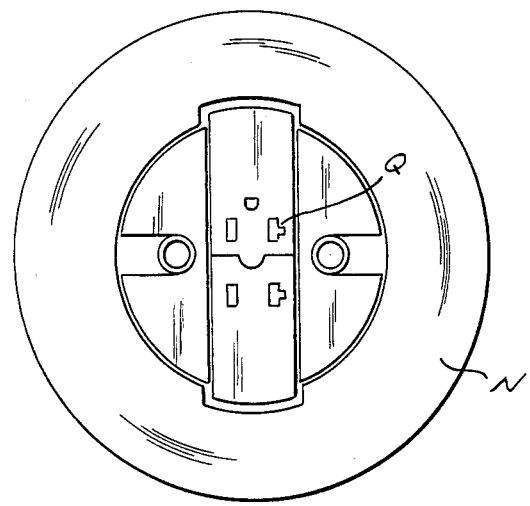
FIG. 2 is a top plan view thereof.
Figure 3:
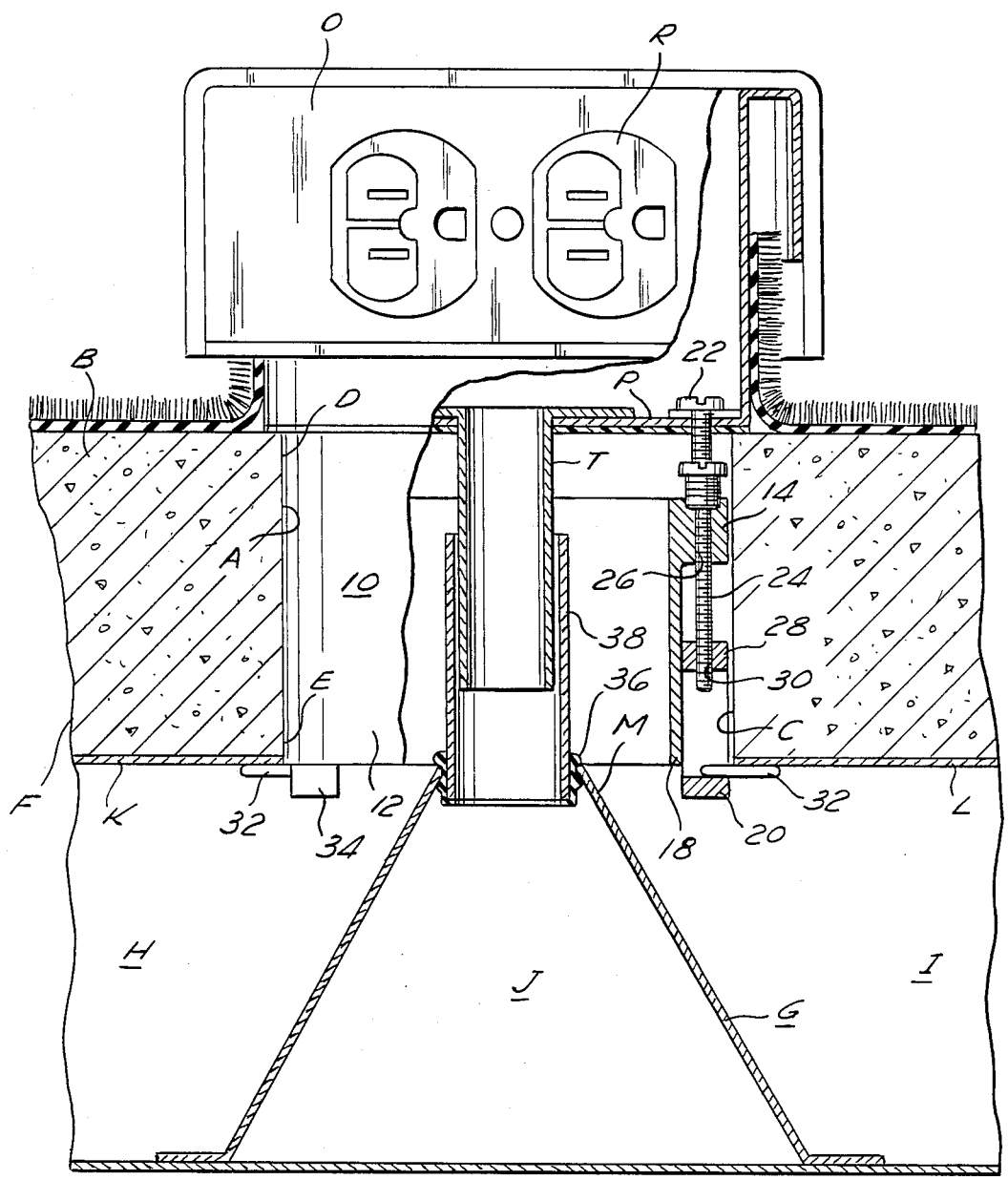
FIG. 3 is an elevational partly broken partly sectional view of a second embodiment of a multiple service fitting installed in a through-floor opening, secured to a multi-cell underfloor raceway and an outlet box.

The device of the invention, in the preferred embodiments thereof as shown in FIGS. 1-3 and as described herein, comprises a multiple service fitting 10, adapted to be inserted into an opening A to be formed in a floor B at a selected location therein. Floor opening A includes tubular side wall C, and first and second opposed ends D and E.

Floor B includes a slab portion F, comprised of concrete, and a raceway portion G, comprised of steel, located under and supporting slab portion F. Fitting 10 may be installed as an after-set in opening A, by forming such opening after setting of such concrete in floor slab portion F, or may be installed as a pre-set before setting of such concrete.

Floor raceway portion G is adapted to include a plurality of cells, as outer cells H and I, and medial cell J. Each such cell forms an underfloor longitudinal channel adapted to loosely hold and isolate such conductors extending therein from the sources thereof. Data conductors may be loosely held in outer raceway cell H, power conductors may be loosely held in medial raceway cell J, and telephone conductors may be loosely held in outer raceway cell I.

Floor opening A may be formed after setting of floor slab portion F so as to extend therethrough, as by core drilling thereof, and may be formed in floor raceway portion G, through top walls K and L of outer raceway cells H and I, and top portion M of medial raceway cell J, as by drilling thereof. First end D of floor opening A extends at the top of floor slab portion F. Second end E of floor opening A comprises the opening formed in top walls K and L of outer raceway cells H and I, and in top portion M of medial cell J.

The outlet for such conductors, in the embodiment shown in FIGS. 1 and 2, comprises a flush outlet N, or as in the embodiment shown in FIG. 3, comprises an outlet box O. Such outlets are adapted to straddle first end D of floor opening A, along with a flange plate P, to which such outlets are to be connected, which likewise straddles first end D of floor opening A.

A power conductor receptacle Q comprises one of such conductor outlets, and includes a body portion R. A housing S extends about receptacle body portion R, and a tubular portion T thereof depends therefrom into fitting 10.

Multiple service fitting 10, upon insertion thereof into floor opening A, is adapted to enable conductors, as power, telephone, and data, to be pulled so as to extend therethrough, and to thereby extend through floor opening A, from sources of such conductors to outlets therefor.

Such fitting 10 includes a body portion 12, adapted to be positioned in floor opening A so as to enable the conductors to be pulled therethrough from raceway cells H, I, and J to flush outlet N or outlet box O therefor. Fitting body portion 12 includes an enlarged flange portion 14, at a first end 16 thereof, and a narrower portion 18, at a second opposed end 20 thereof.

Screws, as 22, are adapted to extend through tapped openings in flange plate P and openings in first end 16 of fitting body portion 12, so as to connect flange plate P to fitting body portion 12. Further screws, as 24, are adapted to extend through tapped openings, as 26, in fitting flange portion 14, to enable engagement of fitting body portion 12 with raceway outer cells H and I and to enable adjustment from first end D of floor opening A, of the position of fitting body portion 12 relative to flange plate P, to compensate for deflection of floor slab portion F.

A mechanism 28, to which screws 24 are connected through openings, as 30, extends from second end 20 of fitting body portion 12. Fitting mechanism 28 is adapted to be inserted into floor opening A, as an attachment to fitting body portion 12. It is further adapted to be movable into engagement with outer raceway cells H and I adjacent second end E of floor opening A, without moving fitting body portion 12, for securing second end 20 of fitting body portion 12 to floor raceway portion G.

Fitting mechanism 28 includes a pair of toggle pins 32, 32 on opposed sides of fitting body portion 12, and retaining members 34, 34 for retaining toggle pins 32, 32 and for enabling gravity drop pivoting of toggle pins 32, 32 into engagement with top walls K and L of outer raceway cells H and I, without moving fitting body portion 12. Retaining members 34, 34 are vertically movable and accessible from floor opening first end D, through screws, as 24, threaded into openings 26 in fitting body flange portion 14 and openings 30 in retaining members 34, 34.

Fitting 10 further includes a grommet 36, adapted to be mounted in top portion M of medial raceway cell J, and a conduit extending tube 38, adapted to extend through grommet 36 from medial raceway cell J, into fitting body portion 12, and about receptacle housing tubular portion T, for protecting and isolating power conductors adapted to extend therethrough for connection to and activation of receptacle Q.

To enable multiple service fitting 10 to be installed as an after-set, floor opening A may be formed in floor slab portion C by core drilling thereof, and in floor raceway portion D may be formed by drilling thereof through the top walls H and I of outer raceway cells E and F and top portion J of medial raceway cell G.

Different types of conductors, as power, telephone, and data, may then be pulled from the separate and isolated sources thereof so as to extend through the openings in top walls H and I of outer raceway cells E and F and top portion J of medial raceway cell G. Grommet 36 and conduit expander tube 38 may then be installed in top portion J of raceway cell G, with the medial power conductor extending therethrough.

The medial power conductor may then be extended through receptacle housing tubular portion T and housig S for connection to receptacle R, and the outer telephone and data conductors may then be pulled through outlet openings therefor in the conductor outlet, as flush outlet N or outlet box O, for enabling connection thereof to telephone and data devices.

Such fitting 10 may then be inserted into floor opening A such that flange plate P straddles first end D of floor opening A, with toggle pins 32, 32 extending in fitting mechanisms 28 of fitting 10, so as to extend and slide along wall C of floor opening A to enable such insertion thereof. Receptacle tubular portion T fits into conduit extending tube 38.

To secure second end 20 of fitting 10 in floor opening A, without moving body portion 12 thereof, screws 24, accessed from first end D of floor opening A, are turned counterclockwise so as to unthread from fitting mechanism retaining members 34, 34, until toggle pins 32, 32 pivot and drop by gravity, and engage top walls K and L of outer raceway cells H and I. Screws 24 may then be turned clockwise so as to thread into fitting mechanism retaining members 34, 34, drawing same towards first end D of floor opening A. Such movement of fitting mechanisms 28, 28 clamps the ends thereof, and the second end 20 of fitting body portion 12 to which they are connected by screws 26, to top walls K and L of raceway cells H and I, thereby securing fitting 10 in floor opening A.

Multiple service fitting 10 may be installed in floor B as above, as either an after-set or a pre-set, and is adapted for use in conjunction with a multi-cell underfloor raceway system, such as floor raceway portion G, and for use with either a flush outlet N (FIGS. 1 and 2) or an outlet box O (FIG. 3).

Fitting mechanism 28 enables fitting 10 to engage floor opening A, after insertion thereof in such opening, by vertically moving gravity-drop toggle pins 32, 32, accessible from first end D of floor opening A, without moving fitting body portion 12. Such mechanism is thereby conveniently operable to effectively and efficiently engage floor opening A, and to compensate for deflection of floor slab portion F.

Grommet 36 protects the surface of the pulling area in top portion M of medial raceway cell J, so that conductors being pulled therethrough will not be damaged. It further provides a seat for conduit extending tube 38, the length of which varies dependent upon whether flush outlet N or outlet box O are used. Conduit extending tube 38 forms a continuous barrier with receptacle tubular portion T which effectively protects and isolates conductors adapted to extend therethrough.

Preferred embodiments of the device of the invention have been set forth above, for the purpose of explaining the invention. However, it is to be understood that variations may be made in such embodiments, which variations are nevertheless within the scope and spirit of the invention as set forth in the claims herein.

We claim:

1. A fitting, adapted to be inserted into an opening to be formed in a floor at a selected location therein, for enabling a conductor to extend through the fitting, and thereby through the floor opening in which the fitting is insertable, from a source to an outlet therefor, in which the floor includes a slab portion, and a raceway portion located under and supporting the slab portion, which raceway portion includes a cell adapted to loosely hold the conductor, which floor opening is adapted to be formed so as to extend through the slab portion and into the raceway cell, and to include a first end in the slab portion and a second opposed end in the raceway cell, further including means for straddling the first end of the floor opening, comprising:

(a) a body portion, adapted to be positioned in the floor opening so as to enable the conductor to be pulled therethrough from the raceway cell to the conductor outlet, which body portion includes first and second opposed ends;

(b) means located at the first end of the body portion, adapted to be connected to the opening straddling means for securing the body portion to the floor slab portion; and (c) means extending from the second end of the body portion, adapted to be inserted with the body portion into the opening, and to be movable into engagement with the raceway cell adjacent the opening therein, without moving the body portion, for securing the second end of the body portion to the raceway cell, comprising a toggle pin, adapted to extend from the second end of the body portion so as to enable insertion of the body portion into the floor opening, and further adapted to pivot into engagement with the raceway cell after insertion of the body portion into the floor opening, and means for enabling pivoting of the toggle pin such that it extends from the second end of the body portion, into engagement with the raceway cell without moving the fitting body portion, accessible and operable from the first end of the fitting body portion.

2. A fitting as in claim 1, in which the conductor comprises a power conductor, and the fitting further comprises a housing mounted in the first end of the body portion, and a receptacle mounted in the housing, to which receptacle the power conductor is adapted to be connected.

3. A fitting as in claim 1, in which the conductor comprises a telephone conductor, and the fitting further comprises a housing mounted in the first end of the body portion, and a jack mounted in the housing, to which jack the telephone conductor is adapted to be connected.

4. A fitting as in claim 1, in which the raceway cell engaging means are further adapted to compensate for deflection of the floor slab portion.

5. A device adapted to comprise a portion of a floor which includes a slab portion, for being located under and supporting the floor slab portion, and adapted to be positionable in an opening to be formed in the floor at a selected location therein, for enabling a conductor to extend therethrough, which floor opening is adapted to be formed so as to extend through the floor slab portion and into the device slab supporting portion, and to include a first end in the floor slab portion and a second opposed end in the device slab supporting portion, comprising:
 (a) a raceway, adapted to comprise a portion of the floor and to be located under and support the floor slab portion, including a cell adapted to loosely hold the conductor; and
 (b) a fitting, adapted to be positionable in the floor opening and to extend relative to the raceway cell, for enabling a conductor to extend therethrough and thereby through the floor opening in which the fitting is insertable, including means for straddling the first end of the floor opening, comprising:
 (1) a body portion, adapted to be positioned in the floor opening so as to enable the conductor to be pulled therethrough from the raceway cell to the conductor outlet, which body portion includes first and second opposed ends;
 (2) means located at the first end of the body portion, adapted to be connected to the opening straddling means for securing the body portion to the floor slab portion; and
 (3) means extending from the second end of the body portion, adapted to be inserted with the body portion into the opening, and to be movable into engagement with the raceway cell adjacent the opening therein, without moving the body portion, for securing the second end of the body portion to the raceway cell, comprising a toggle pin, adapted to extend from the second end of the body portion so as to enable insertion of the body portion into the floor opening, and further adapted to pivot into engagement with the raceway cell after insertion of the body portion into the floor opening, and means for enabling pivoting of the toggle pin such that it extends from the second end of the body portion, into engagement with the raceway cell without moving the fitting body portion, accessible and operable from the first end of the fitting body portion.

6. A device as in claim 5, in which the raceway cell includes a grommet mounted in an opening therein, adapted to protect the conductor upon pulling thereof through the raceway cell opening.

7. A device as in claim 5, in which the raceway cell further includes means for enabling extension thereof through the opening therein and into the fitting body portion, adapted to isolate and protect the conductor upon pulling thereof through such extension enabling means.

8. A device as in claim 5, in which the conductor comprises a plurality of conductors, the raceway cell comprises a plurality of cells, and the plurality of conductors are loosely held separately in the plurality of raceway cells so as to be isolated from each other.

9. A device as in claim 8, in which the plurality of conductors comprise power, telephone, and data conductors, and the plurality of cells comprise three cells, one for separately holding each of the power, telephone, and data conductors.

* * * * *